(12) United States Patent
Khoshkava et al.

(10) Patent No.: US 11,100,771 B2
(45) Date of Patent: *Aug. 24, 2021

(54) DEVICES AND METHODS FOR PROVIDING LOCALIZED HAPTIC EFFECTS TO A DISPLAY SCREEN

(71) Applicant: Immersion Corporation, San Jose, CA (US)

(72) Inventors: Vahid Khoshkava, Montreal (CA); Juan Manuel Cruz Hernandez, Montreal (CA); Neil T. Olien, Montreal (CA)

(73) Assignee: IMMERSION CORPORATION, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/705,736

(22) Filed: Dec. 6, 2019

(65) Prior Publication Data

US 2020/0184785 A1     Jun. 11, 2020

Related U.S. Application Data

(63) Continuation of application No. 16/006,372, filed on Jun. 12, 2018, now Pat. No. 10,504,342.

(51) Int. Cl.
    *H04B 3/36*      (2006.01)
    *G08B 6/00*      (2006.01)
    (Continued)

(52) U.S. Cl.
CPC .............. *G08B 6/00* (2013.01); *G06F 1/1652* (2013.01); *G06F 3/016* (2013.01)

(58) Field of Classification Search
CPC .......... G08B 6/00; G06F 1/1652; G06F 3/016
See application file for complete search history.

(56) References Cited

U.S. PATENT DOCUMENTS

2008/0303782 A1   12/2008   Grant et al.
2010/0013613 A1   1/2010   Weston
(Continued)

FOREIGN PATENT DOCUMENTS

CN      104395866 A    3/2015
EP       2527956 A1    11/2012
(Continued)

OTHER PUBLICATIONS

The Extended European Search Report issued in European Application No. 19179335, dated Oct. 4, 2019.
(Continued)

*Primary Examiner* — Phung Nguyen
(74) *Attorney, Agent, or Firm* — Medler Ferro Woodhouse & Mills PLLC

(57) ABSTRACT

Devices and methods for providing localized haptic effects are provided. The devices include a haptically enabled display device having one or more haptic actuators. The one or more haptic actuators are located in a non-viewing area of a display screen of a haptically enabled display device and cause localized haptic effects in a viewing area of the display screen. The haptically enabled display device includes a processor configured to determine haptic control signals for activating the haptic actuators. The haptic control signal activates the one or more haptic actuators to provide a localized haptic effect at a target location in the viewing area, remote from the non-viewing area location of the one or more haptic actuators.

17 Claims, 13 Drawing Sheets

(51) Int. Cl.
*G06F 1/16* (2006.01)
*G06F 3/01* (2006.01)

(56) References Cited

U.S. PATENT DOCUMENTS

| | | |
|---|---|---|
| 2012/0200520 A1* | 8/2012 | Harris ................. G06F 3/04886 345/173 |
| 2012/0229424 A1 | 9/2012 | Behles et al. |
| 2013/0113760 A1 | 5/2013 | Gossweiler, III et al. |
| 2013/0285910 A1 | 10/2013 | Adachi et al. |
| 2013/0296053 A1 | 11/2013 | Rasmussen et al. |
| 2013/0321299 A1 | 12/2013 | Kim et al. |
| 2014/0104216 A1 | 4/2014 | Adachi et al. |
| 2014/0132568 A1 | 5/2014 | Hirose et al. |
| 2014/0232657 A1* | 8/2014 | Aviles ..................... G06F 3/016 345/173 |
| 2015/0169060 A1 | 6/2015 | Hudin et al. |
| 2018/0004294 A1* | 1/2018 | Eraslan ................. G06F 3/0202 |
| 2018/0039376 A1* | 2/2018 | Peterson ............ H03K 17/9622 |
| 2018/0081441 A1* | 3/2018 | Pedder ................ G06F 3/04164 |
| 2018/0329494 A1* | 11/2018 | Hernandez Santisteban ............... G06F 3/016 |
| 2018/0335846 A1 | 11/2018 | Toma et al. |
| 2019/0011988 A1* | 1/2019 | Khoshkava ......... G06F 3/04164 |

FOREIGN PATENT DOCUMENTS

| | | |
|---|---|---|
| JP | 2010529555 A | 8/2010 |
| JP | 2012038289 A | 2/2012 |
| KR | 10-2012-0074831 A | 7/2012 |
| KR | 10-2014-0143236 A | 12/2014 |
| KR | 10-2017-0082001 A | 7/2017 |
| WO | 2014057593 A1 | 8/2016 |
| WO | 2014083751 A1 | 1/2017 |
| WO | 2015151380 A1 | 4/2017 |

OTHER PUBLICATIONS

Office Action dated Sep. 15, 2020 in Japanese Patent Appl No. 2019-109154 (with English translation).
Office Action dated May 28, 2021 in Korean Appl No. 10-2019-0066555.
Communication Pursuant to Article 94(3) EPC dated Apr. 16, 2021 in EP Appl No. 19 179 335.5.

* cited by examiner

DEVICES AND METHODS FOR PROVIDING LOCALIZED HAPTIC EFFECTS TO A DISPLAY SCREEN

FIELD OF THE INVENTION

Embodiments hereof relate to devices and methods for providing localized haptic effects to a display screen. In particular, embodiments hereof include haptically enabled display devices having haptic actuators located outside of a viewing area of a display screen and configured to provide localized haptic effects inside the viewing area of the display screen.

BACKGROUND OF THE INVENTION

Conventional display screens frequently include devices for providing haptic feedback to a user of the device. Haptic feedback in display screens may be provided by haptic actuators that cause the entirety of the display screen to shake and/or vibrate. Actuating the entirety of a display screen can cause difficulties, particularly as the size of the display screen gets larger. Providing a haptic effect across the entirety of the display screen, when a user is only touching the display screen in one or two places, is inefficient. Further, providing the haptic effect across the entirety of the display screen does not permit haptic effects to be delivered selectively. Each body part touching the display screen will experience the same haptic effect, regardless of whether the haptic effect is intended for each body part.

These and other drawbacks exist with conventional haptically enabled display devices. These drawbacks are address by the inventions described herein.

BRIEF SUMMARY OF THE INVENTION

Embodiments of the invention include haptically enabled display devices configured for the provision of localized haptic effects. A haptically enabled display device according to embodiments of the invention has one or more haptic actuators located outside of a viewing area of a display screen of the haptically enabled display device. When activated at specific amplitudes and frequencies determined according to characteristics of the display device, the haptic actuators can provide localized haptic effects at specific target locations within the viewing area of the display device. Accordingly, the haptic actuators can operate more efficiently than in conventional techniques, by providing the haptic effects only at specific locations. Additionally, haptic actuators located outside of the viewing area will not obscure any portion of the images provided by the display device. Furthermore, the haptic actuators can deliver the haptic effects selectively and only to areas of the display device where experience of the haptic effect is desired.

In an embodiment, a haptically enabled display device is provided. The haptically enabled display device includes a display screen having a viewing area and a non-viewing area, the display screen comprising a plurality of display components configured for providing a visual display in the viewing area. The haptically enabled display device further includes a plurality of haptic actuators secured to the display screen in the non-viewing area and at least one processor. The at least one processor is configured to select at least one haptic actuator from among the plurality of haptic actuators, to determine a haptic control signal configured to activate the at least one haptic actuator and to thereby cause a localized haptic effect at a target location in the viewing area of the display screen, and transmit the haptic control signal to the at least one haptic actuator to cause the localized haptic effect at the target location.

In another embodiment, a method of delivering haptic effects to a display screen having a viewing area and a non-viewing area is provided. The display screen includes a plurality of display components configured for providing a visual display in the viewing area. The method includes selecting, by at least one processor, at least one haptic actuator from among a plurality of haptic actuators secured to the display screen in the non-viewing area, determining, by the at least one processor, a haptic control signal configured to activate the at least one haptic actuator so as to cause a localized haptic effect at a target location in the viewing area of the display screen, transmitting the haptic control signal to the at least one haptic actuator, and causing, by the at least one haptic actuator, the localized haptic effect at the target location.

BRIEF DESCRIPTION OF DRAWINGS

The foregoing and other features and advantages of the invention will be apparent from the following description of embodiments hereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Figure 1:
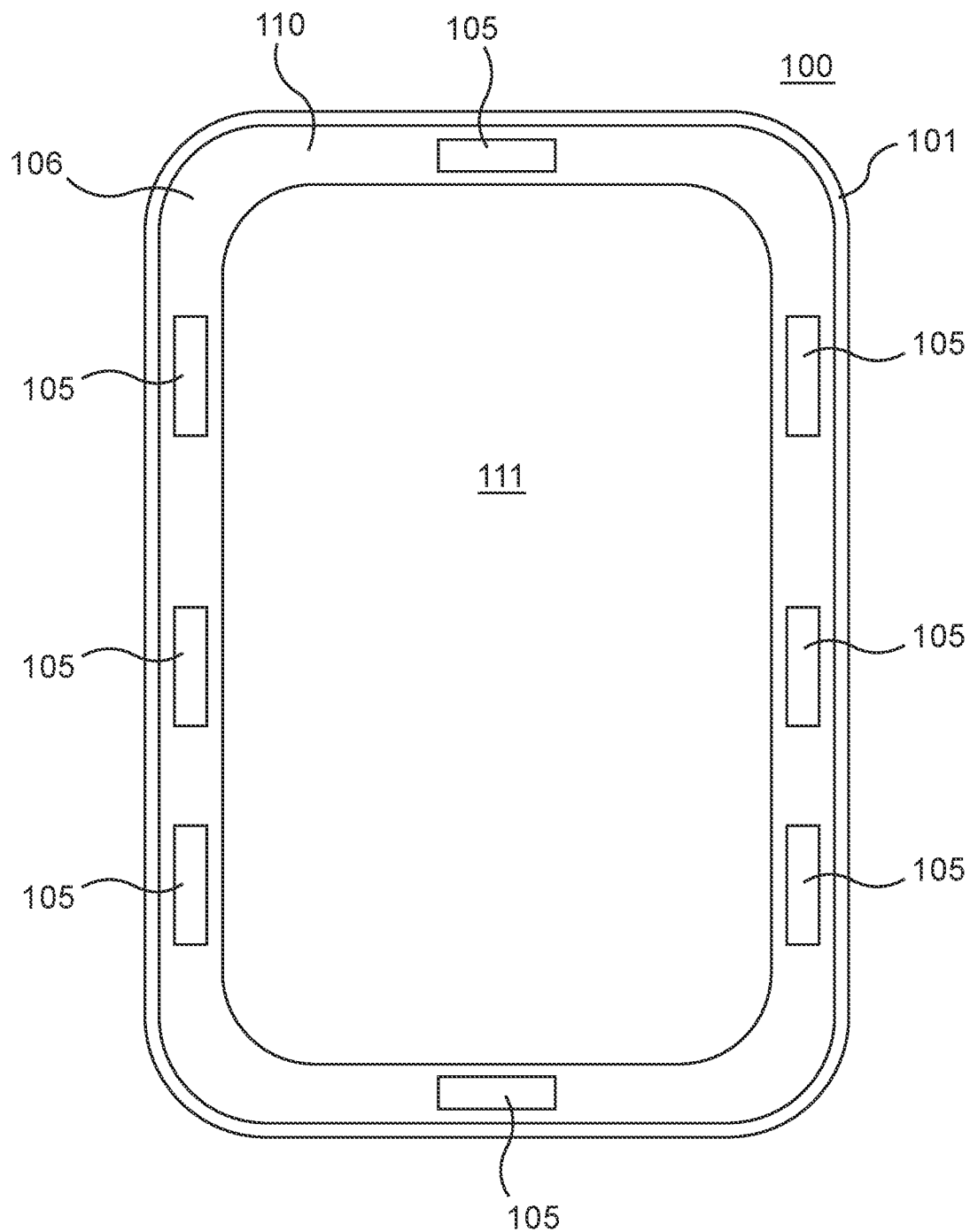
FIG. 1 illustrates a haptically enabled display device in accordance with an embodiment hereof.

Specific embodiments of the present invention are now described with reference to the figures. The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Embodiments of the present invention are directed to haptically enabled display devices configured to provide localized haptic effects. Haptically enabled display devices in accordance with embodiments described herein include haptic actuators arranged outside of a viewing area of a display or display screen of the haptically enabled display device and configured to cause localized haptic effects inside the viewing area. The haptic actuators may be arranged around a periphery of the viewing area of the display screen and, in accordance with embodiments hereof, may be arranged on an opposite side of the display screen from the viewing area. A processor associated with the haptically enabled display device activates one or more of the haptic actuators to establish a standing wave interference pattern in the viewing area to cause a localized haptic effect in a target location of the viewing area, while causing only substantially imperceptible haptic effects in areas outside of the target location. The haptic actuators located in the non-viewing area of a display screen thus provide localized haptic effects in the viewing area of the display screen.

For example, a haptically enabled display device according to an embodiment hereof may include an in-dashboard display screen in a car. The haptic actuators may be located in a non-viewing area of the in-dashboard display screen, thus providing as large of a viewing area as possible. When a user interacts with the in-dashboard display screen, they may do so by touch, while keeping their eyes on the road. The in-dashboard display screen may be configured to provide localized haptic effects to target locations on a screen of the in-dashboard display screen that the user is touching, thus providing information and feedback to the user even though the user is not viewing the screen.

In another example, an interactive subway map may include a large digital display screen. It may be impractical or expensive to haptically actuate the entire display screen or to include enough actuators mounted to specific portions of the display screen to actuate the specific portions. Haptic actuators according to embodiments hereof may be included in a non-viewing area of the display screen to provide localized haptic effects to specific locations of the display screen as a user interacts with it.

In yet another example, a user's tablet, smartphone, phablet, or other personal device may include haptic actuators according to embodiments hereof included in a non-viewing area of a display screen. By locating the actuators in a non-viewing area, no portion of the display screen is obscured. Further, by activating only a portion of the display screen based on a user's interaction, less power may be consumed, conserving battery life. Additionally, the system may offer unique haptic experiences. For example, the system may provide multiple localized haptic effects to correspond to a user's multi-contact touch with a device touchscreen. The multiple localized haptic effects may differ, e.g., a user may feel a stronger or different haptic effect with each finger that contacts the touchscreen. Multiple localized haptic effects may be used to efficiently communicate haptic feedback to a user in ways that are not possible through activation of the entirety of the device touchscreen.

The foregoing examples and others are consistent with the embodiments discussed below.

Embodiments described herein relate to devices and systems that include a haptically enabled display device having a computer system and a display screen. Computer systems consistent with the present invention may be configured as a gaming console, a handheld gaming device, a personal computer (e.g., a desktop computer, a laptop computer, etc.), a smartphone, a tablet computing device, a television, an interactive sign, and/or other device that can be programmed to provide a haptic control signal. The computer system may include one or more processors (also interchangeably referred to herein as processors, processor(s), or processor for convenience), one or more memory units, audio outputs, user input elements, a communication unit or units, and/or other components. Computer system processors may be programmed by one or more computer program instructions to carry out methods described herein. Communication units consistent with the present invention may include any connection device, wired or wireless, that may transmit or communicate with peripheral devices.

In alternative embodiments, haptically enabled display devices in accordance herewith may be provided separately from computer systems configured to provide haptic control signals to the haptically enabled display device. Such computer systems may include one or more processors, one or more memory units, audio outputs, user input elements, a haptic communication unit or units, and/or other components. Such computer system processors may be programmed by one or more computer program instructions to carry out methods described herein by haptic control signals transmitted to the haptically enabled display device via the haptic communication unit(s). Haptic communication units consistent with the present invention may include any connection device, wired or wireless, that may transmit or communicate a haptic control signal from a processor to haptic actuators associated with the haptically enabled display device. In embodiments hereof, a haptic communication unit may be a dedicated unit configured solely for delivering a haptic control signal. In further embodiments, a haptic communication unit may further function to deliver a myriad of other communications, wired or wirelessly, to an external device.

Haptically enabled display devices include devices having one or more haptic actuators for delivering a haptic effect to a display screen of the haptically enabled display device. In embodiments hereof, haptically enabled display devices may be devices that include one or more haptic actuators that directly receive haptic control signals, for example, from the processor of the haptically enabled display device, for actuation. In additional embodiments, haptically enabled display devices may further include one or more processors that may process or interpret a haptic output signal received from a remote device before delivering the haptic control signal to the one or more haptic actuators. In further embodiments, haptically enabled display devices may also include user input elements, e.g., control elements such as triggers, buttons, joysticks, joypads, etc., to permit a user to interact with a computer system. Haptically enabled display devices may include haptically enabled peripheral devices, which are devices designed to function as accessory or peripheral units to a central device, such as a computer system consistent with embodiments hereof.

FIG. 1 illustrates a haptically enabled display device 100 in accordance with an embodiment hereof. The haptically enabled display device 100 includes a display screen 106 and a housing 101. The display screen 106 includes a viewing area 111 and a non-viewing area 110. The haptically enabled display device 100 further includes a plurality of haptic actuators 105 secured to the display screen 106 in the non-viewing area 110. The housing 101 and the display screen 106 may be flexible or may be rigid.

The display screen 106 includes a plurality of display components (not shown) configured for providing images for a visual display in the viewing area 111. The display screen 106 may be any type of display screen known in the art, including, for example, a light emitting diode (LED) display, a liquid crystal display (LCD), an LED-backlit LCD, an organic light emitting diode (OLED) display, an active matrix organic light emitting diode (AMOLED) display, a plasma display, and others. For example, an OLED display includes organic light emitting diodes as display components, while an LCD includes liquid crystals as display components. Other display types may include other types of display components. The plurality of display components are arranged so as to provide a visual display in the viewing area 111 of the display screen 106 and such that no visual display is provided in the non-viewing area 110 of the display screen 106. In accordance with embodiments hereof, the viewing area 111 may be located above areas of the display screen 106 having display components and the non-viewing area 110 may be located above areas of the display screen 106 devoid of display components.

In FIG. 1 the non-viewing area 110 surrounds a periphery of and forms a border around the viewing area 111. This arrangement is exemplary only. The viewing area 111 and the non-viewing area 110 are not required to form regular shapes as shown in FIG. 1, and may be interspersed. For example, the viewing area 111 may include irregular projections into the non-viewing area 110. In accordance with embodiments hereof, the non-viewing area 110 may border the viewing area 111 on only one, two, or three sides of the viewing area 111, rather than the four sides shown in FIG. 1. Alternative arrangements of the viewing area 111 and the non-viewing area 110 may be employed without departing from the scope of the invention. In accordance with embodiments hereof, the viewing area 111 may extend to all portions of the display screen 106 that do not include haptic actuators 105.

In other embodiments, the haptically enabled display device 100 may include a display screen 106 without a housing 101. A display screen 106 of the haptically enabled display device 100 with no housing may include any or all of the other components described herein. Thus, a haptically enabled display device 100 having a display screen 106 without a housing 101 may be configured to be installed or mounted to an externally provided or custom-built housing. In accordance with embodiments hereof, the haptically enabled display device 100 may include a display screen 106 without a housing 101 that is adapted for use without any sort of housing. For example, the display screen 106 may include a flexible OLED display or an electronic paper display. In such embodiments, the non-viewing area 110 and viewing area 111 may be arranged on a same side of the display screen 106, as discussed above, or may be arranged on opposite sides of the display screen 106. In accordance with embodiments hereof, a first non-viewing area 110 may be located on an opposite side of the display screen 106 as the viewing area 111, as shown and described with reference to FIGS. 8A, 8B, 9A and 9B, or a second non-viewing area 110 may be located on a same side of the display screen as the viewing area 111.

The haptically enabled display device 100 includes a plurality of haptic actuators 105 secured to the display screen 106. The haptic actuators 105 may include any suitable actuator known in the art. For example, the haptic actuators 105 may include thin film actuators, such as macro-fiber composite (MFC) actuators, piezoelectric material actuators, smart material actuators, electro-polymer actuators, and others. The haptic actuators 105 may further include inertial or kinesthetic haptic actuators, eccentric rotating mass ("ERM") haptic actuators in which an eccentric mass is moved by a motor, linear resonant haptic actuators ("LRAs") in which a mass attached to a spring is driven back and forth, vibrotactile haptic actuators, shape memory alloys, and/or any combination of haptic actuators described above.

The arrangement of the haptic actuators 105 on all four sides of the haptically enabled display device 100 illustrated in FIG. 1 is by way of example not limitation. Alternative arrangements may be used in different embodiments of the invention. For example, more or fewer haptic actuators 105 may be used, and the haptic actuators 105 may be arranged in any number on only one side, two sides or three sides of the viewing area 111. In accordance with embodiments hereof, larger haptic actuators 105 may be used to reduce the number needed for providing a localized haptic effect, with each of the larger haptic actuators 105 extending along an entire length of the viewing area 111 on one or more sides thereof. In accordance with embodiments hereof, a single continuous haptic actuator 105 may be used, as described with reference to FIG. 10 below.

In accordance with embodiments hereof, the display screen 106 may be rigidly secured to the housing 101. Because the provision of localized haptic effects by the haptic actuators 105 does not rely on conventional actuation of an entire display screen, the display screen 106 may be secured to the housing without suspension elements. Rigid attachment of the display screen 106 to the housing 101 is optional, however, and is not a requirement of the invention. In further embodiments, the display screen 106 may be mounted to the housing 101 via suspension elements.

Figure 2:
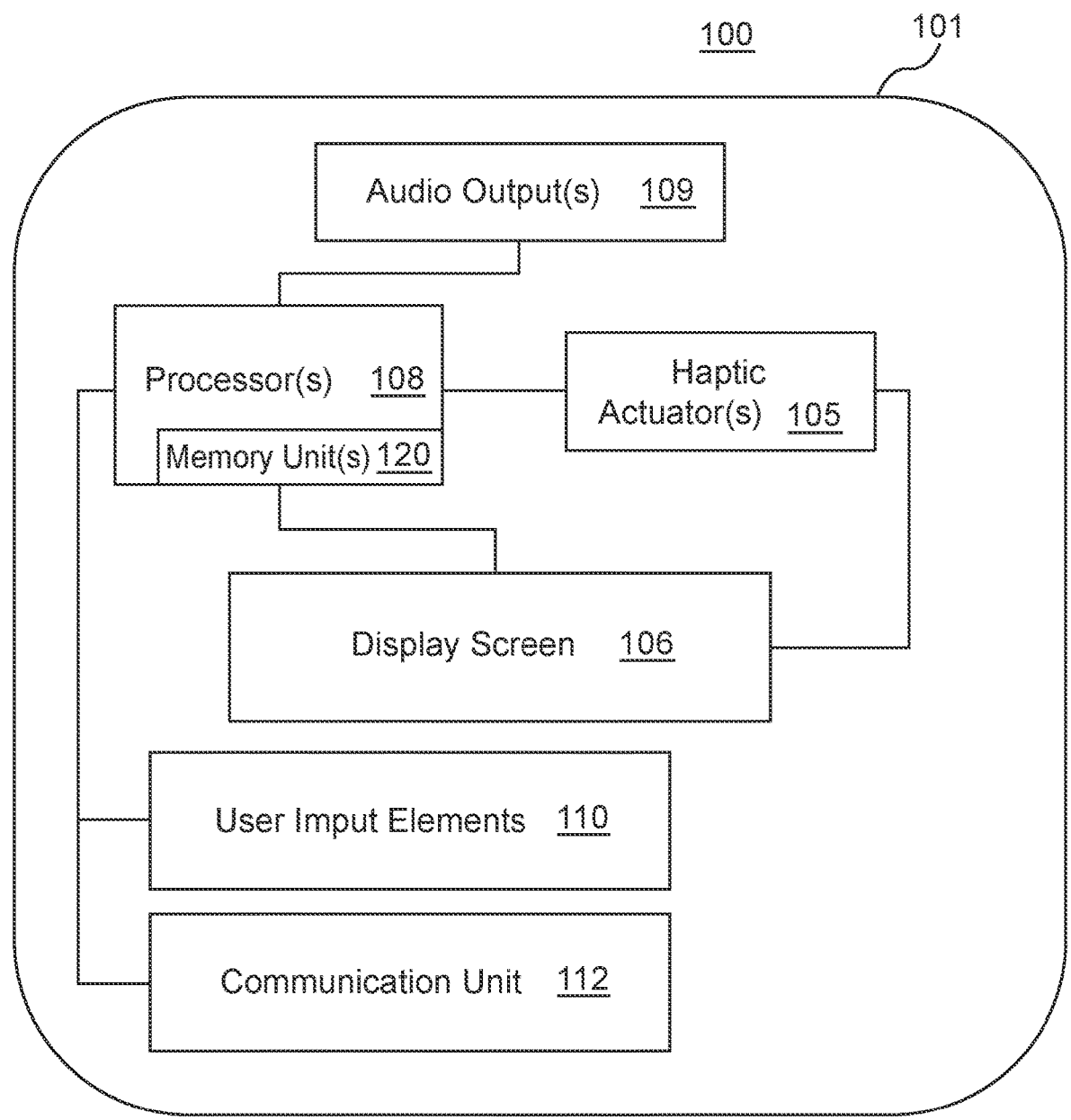
FIG. 2 is a schematic diagram illustrating aspects of the haptically enabled display device of FIG. 1.

FIG. 2 is a schematic diagram illustrating aspects of the haptically enabled display device 100 of FIG. 1. In the embodiment illustrated in FIG. 2, the haptically enabled display device 100 includes at least one processor 108, at least one memory unit 120, one or more haptic actuators 105, a display screen 106, a housing 101, audio outputs 109, user input elements 110, and a communication unit 112.

The haptically enabled display device 100 may include one or more processors 108, one or more memory units 120, and/or other components. The processors 108 may be programmed by one or more computer program instruction stored in the memory unit(s) 120. The functionality of the processor 108, as described herein, may be implemented by software stored in the memory unit(s) 120 or another computer-readable or tangible medium, and executed by the processor 108. As used herein, for convenience, the various instructions may be described as performing an operation, when, in fact, the various instructions program the processors 108 to perform the operation. In other embodiments, the functionality of the processor may be performed by hardware (e.g., through the use of an application specific integrated circuit ("ASIC"), a programmable gate array ("PGA"), a field programmable gate array ("FPGA"), etc.), or any combination of hardware and software.

The various instructions described herein may be stored in the memory unit(s) 120, which may comprise random access memory (RAM), read only memory (ROM), flash memory, and/or any other memory suitable for storing software instructions. The memory unit(s) 120 may store the computer program instructions (e.g., the aforementioned instructions) to be executed by the processor 108 as well as data that may be manipulated by the processor 108.

The user input elements 110 may include any elements suitable for accepting user input. These may include buttons, switches, dials, levers, touchscreens, and the like. User input elements 110 may further include peripherally connected devices, such as mice, joysticks, game controllers, keyboards, and the like.

The communication unit 112 includes one or more devices or components configured for external communication. The communication unit may include wired communication ports, such as USB ports, HDMI® ports, A/V ports, optical cable ports, and any other component or device configured to receive or send information in a wired fashion. The communication unit may further include wireless communication devices, such as BLUETOOTH® antennas, WI-FI® antennas, cellular antennas, infrared sensors, optical sensors, and any other device configured to receive and/or transmit information wirelessly.

Although illustrated in FIG. 2 as being located within the housing 101, in alternative embodiments, the processor 108 may be located external to the housing 101 of the haptically enabled display device 100. As discussed above, some embodiments of the haptically enabled display device 100 may not include a housing 101, and thus processor 108 may be located remotely. In additional embodiments, the processor 108 may include multiple interconnected processors, some of which may be located within housing 101 and some of which may be located external to the housing 101. In still further embodiments, the processor 108 may include cloud processors configured to provide the haptically enabled display device 100 with a haptic control signal.

Figure 3A:
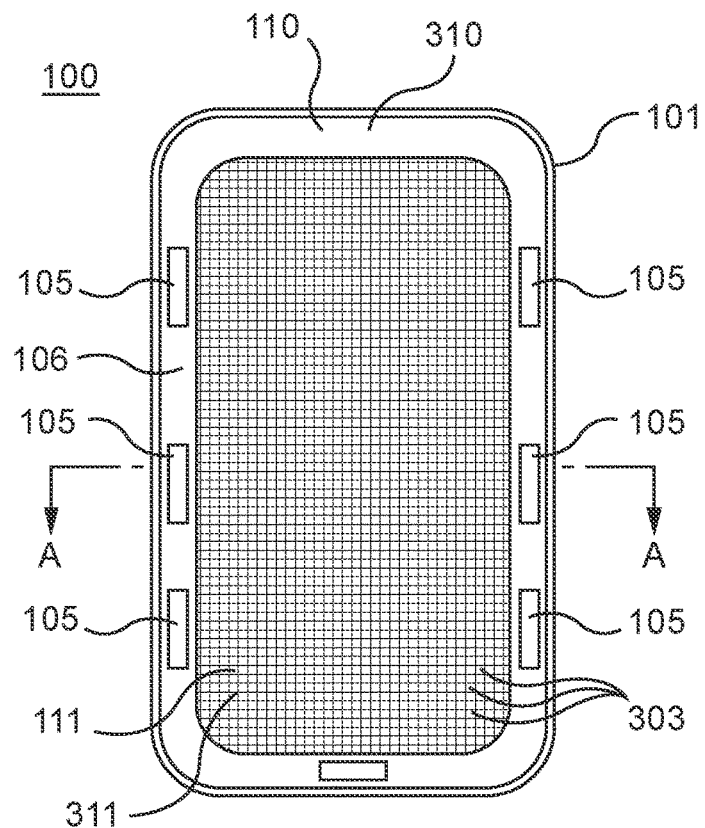
FIGS. 3A and 3B illustrate structural aspects of a haptically enabled display device in accordance with an embodiment hereof.
Figure 3B:
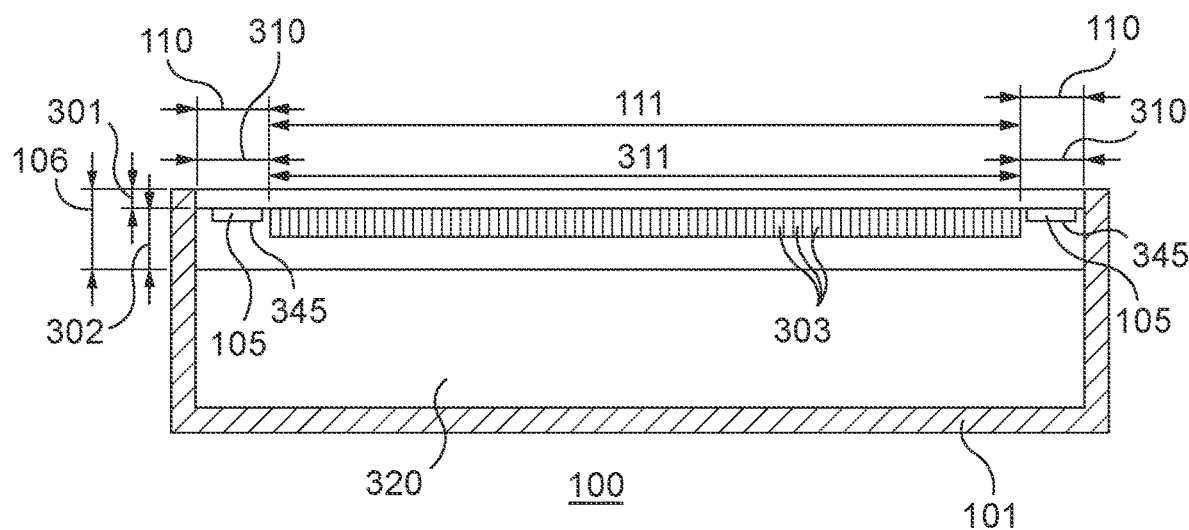

FIGS. 3A and 3B illustrate construction of the display screen 106 of the haptically enabled display device 100 in accordance with embodiments hereof. FIG. 3A is a plan view of the haptically enabled display device 100, while FIG. 3B is a cross-sectional view taken along line A-A of FIG. 3A. In the embodiment of FIGS. 3A and 3B, the display screen 106 is constructed of a transparent layer 301 and a substrate 302. A plurality of display components 303 are located on the substrate 302. The display components 303 are arranged on the substrate 302 to define a display portion 311 of the substrate 302. A non-display portion 310 of the substrate 302, which borders the display portion 311, remains free of the display components 303. The transparent layer 301, which may comprise glass, plastic, and/or any other transparent material, overlays the substrate 302, extending over both the display portion 311 and the non-display portion 310. The display screen 106 may be secured to housing 101, which may be a rigid or flexible housing. In the embodiment illustrated, the housing 101 is a rigid housing. The haptically enabled display device 100 further includes a component space 320 within the housing 101. The component space 320 is configured to contain additional componentry required by the haptically enabled display device, including, for example, the processor 108 and the memory 120, as well as other components.

The construction of the haptically enabled display device 100 illustrated in FIGS. 3A and 3B may be consistent with construction of LED screens, LCD screens, OLED screens, plasma screens, AMOLED screens, and other types of flat panel displays that include a transparent material, e.g., glass or plastic, overlaying componentry for producing a visual display. The substrate 302 and the display components 303 are representative of different technology dependent mounting structures and display producing elements used for producing a visual display. Despite differences in the exact details of the substrate 302 and the display components 303 between the various flat panel technologies discussed, in the embodiment of FIGS. 3A and 3B, the haptic actuators 105 remain located between the transparent layer 301 and the substrate 302.

In embodiments, the display screen 106 may not require transparent layer 301 overlaying the substrate 302 and display components 303. In such embodiments, the display components 303 of the display screen 106 may be configured for direct contact with a user.

FIGS. 3A and 3B illustrate the positioning of various components of the display screen 106, including the transparent layer 301, substrate 302, display portion 311, and non-display portion 310, relative to the viewing area 111, and non-viewing area 110. Also illustrated is the relative positioning of the haptic actuators 105 to the various components of the display screen 106. The display portion 311 of the substrate 302, as defined by the arrangement of the display components 303, corresponds to the viewing area 111 of the display screen 106, as can be seen in FIG. 3A. The arrangement of the display components 303 provides a visual display in the display portion 311 which may be viewed through the transparent layer 301. The display portion 311 of the substrate 302 defines the viewing area 111 of the display screen 106, and thus has substantially the same dimensions. The non-display portion 310 of the substrate 302 defines the non-viewing area 110 and thus has substantially the same dimensions. The non-viewing area 110 and the non-display portion 310 may be located around a periphery of the viewing area 111 and the display portion 311. The haptic actuators 105 are located in the non-viewing area 110 of the display screen 106, and thus no portion of the viewing area 111 or the visual display produced by the display components 303 in the display portion 311 is obscured or obstructed by the haptic actuators 105.

As illustrated in FIGS. 3A and 3B, the non-viewing area 110 and the non-display portion 310 may surround the viewing area 111 and the display portion 311 on four sides, forming a complete enclosure or frame. In alternative embodiments, the non-viewing area 110 and the non-display portion 310 may partially surround the viewing area 111 and the display portion 311. In additional embodiments, the non-viewing area 110 and the non-display portion 310 may be located on only one, two, or three sides of the viewing area 111 and the display portion 311, permitting the viewing area to extend to the edges of the display screen 106. In further embodiments, the non-viewing area 110 and the non-display portion 310 may be discontinuous on any of one, two, three, and/or four sides of the viewing area 111 and the display portion 311, permitting the viewing area 111 to have lateral segments that extend to the edges of the display screen 106.

In the embodiment of FIGS. 3A and 3B, the haptic actuators 105 are secured to the transparent layer 301 between the transparent layer 301 and the substrate 302. The haptic actuators 105 may be thin film haptic actuators. As shown in FIG. 3B, the haptic actuators 105 are located in a non-display portion 310 of the substrate 302, corresponding to a non-viewing area 110 of the display screen 106. FIG. 3B illustrates the substrate 302 having a cut-out or indentation 345 to accommodate the thickness of the haptic actuators 105. In alternative embodiments, no cut-out or indentation 345 is provided, and the haptic actuators 105 are sandwiched between the substrate 302 and the transparent layer 301. In other embodiments, the haptic actuators 105 do not contact the substrate 302, and are secured to the transparent layer 301 with a gap between the substrate 302 and the haptic actuators 105. In further embodiments, the haptic actuators 105 are secured to the transparent layer 301 via adhesive.

The embodiment illustrated in FIGS. 3A and 3B is an example only of the haptically enabled display device 100 and the display screen 106. The haptically enabled display device 100 and the display screen 106 may be constructed in alternative ways consistent with additional embodiments disclosed herein. While some description refers directly to components and aspects of this embodiment, it will be understood by those of skill in the art that the principals of the invention may be applied to alternative embodiments, some of which are further described below.

Figure 4A:
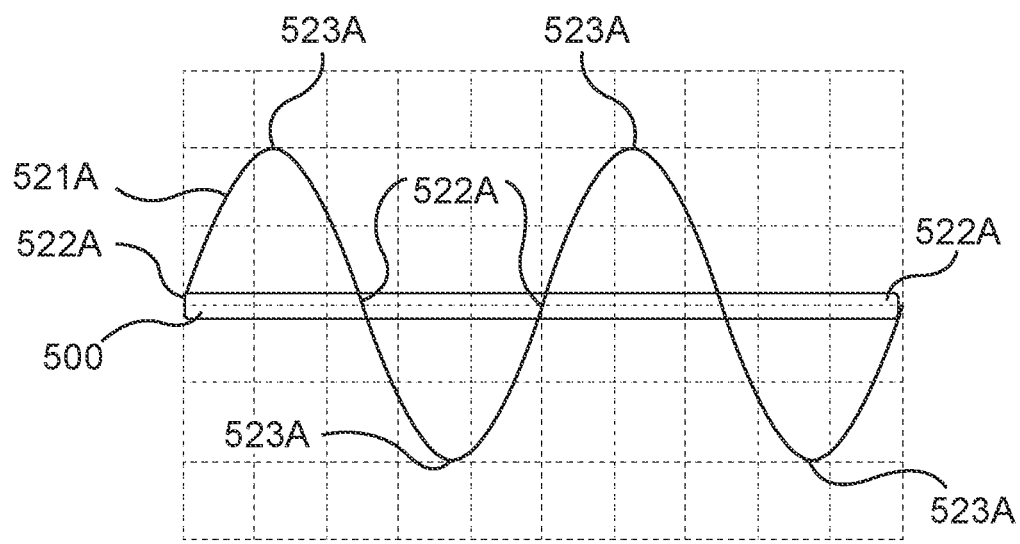
FIGS. 4A-4C illustrate vibrational modes of a haptically enabled display device in accordance with embodiments hereof.
Figure 4B:
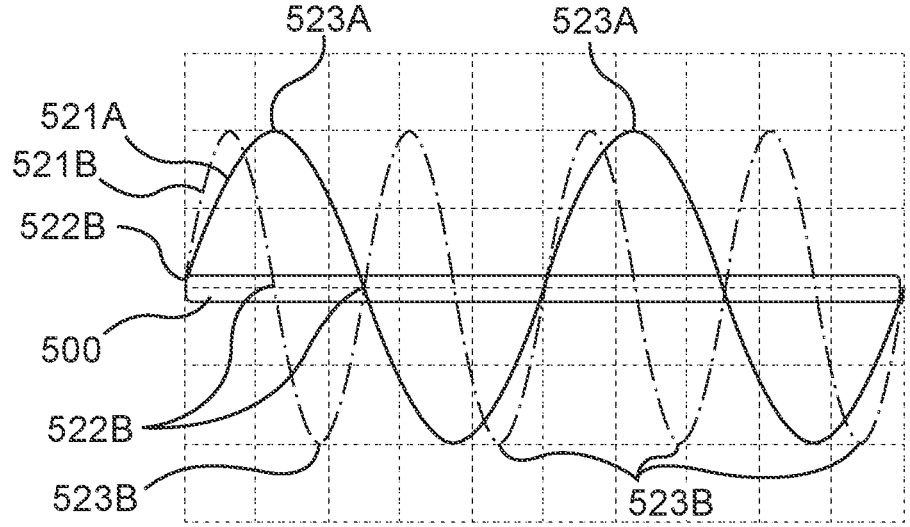
Figure 4C:
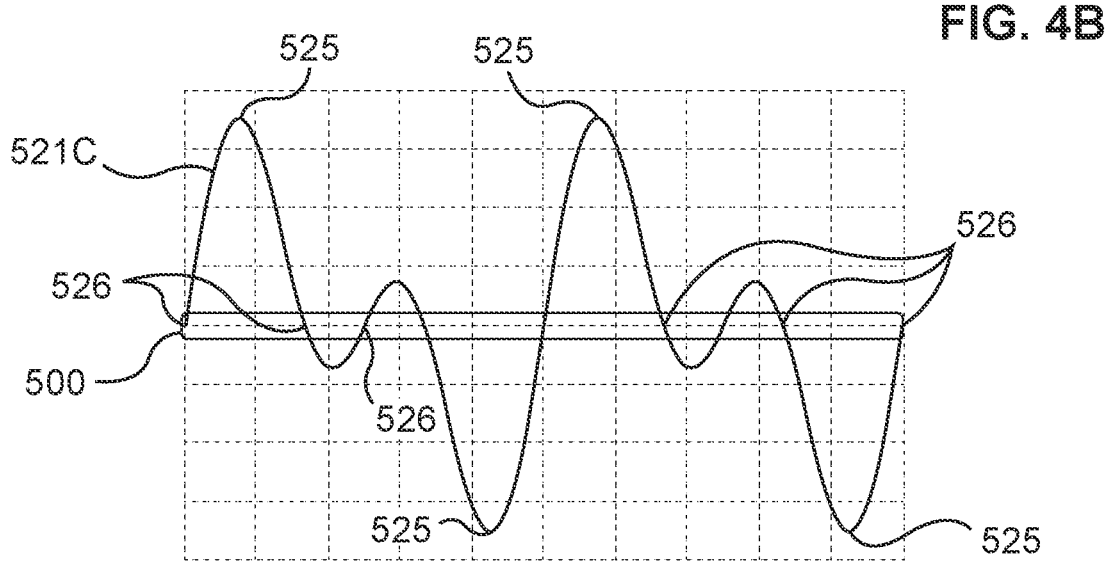
Figure 5A:
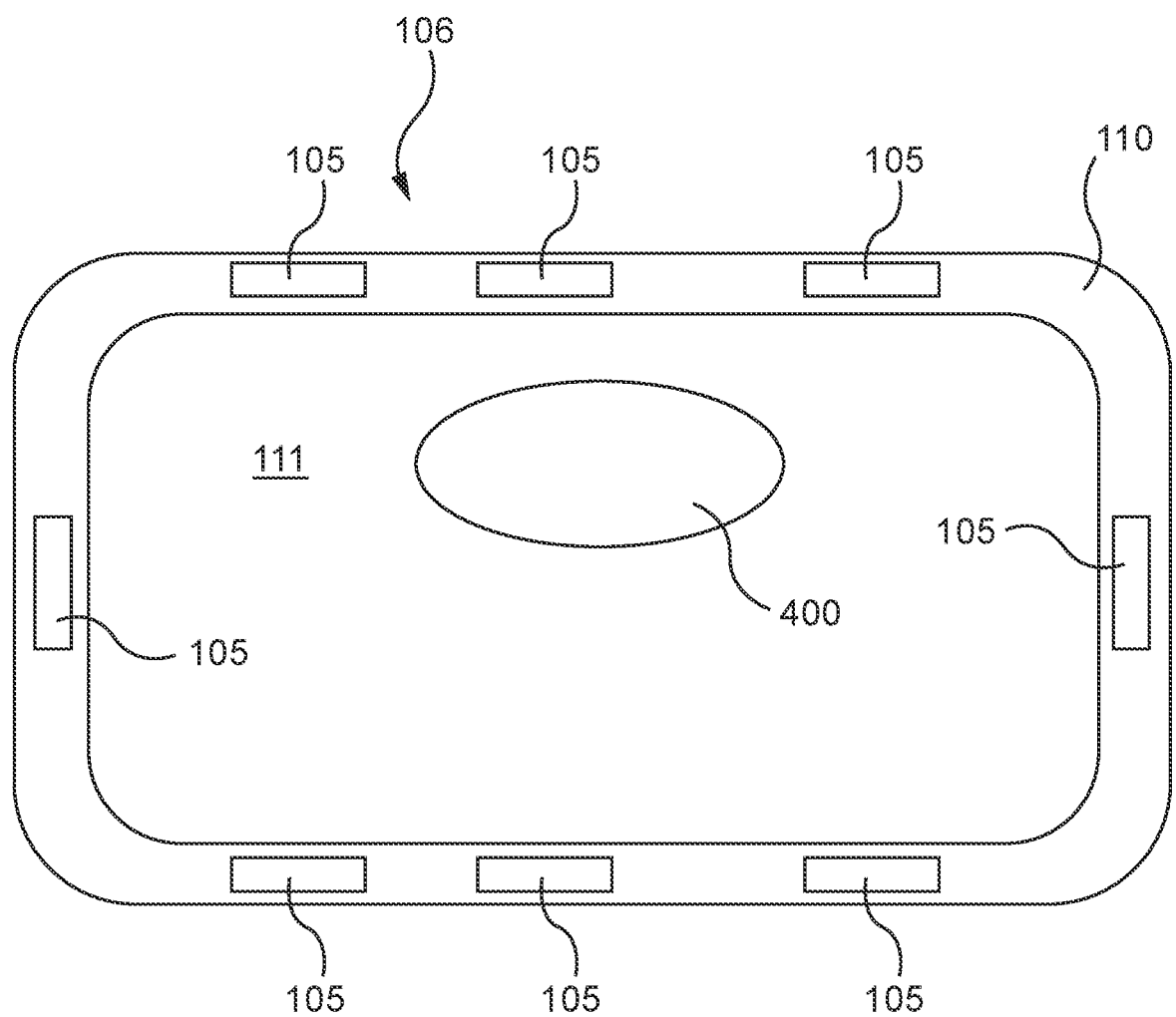
FIGS. 5A-5C illustrate target locations for haptic effects on a display screen in accordance with embodiments hereof.
Figure 5B:
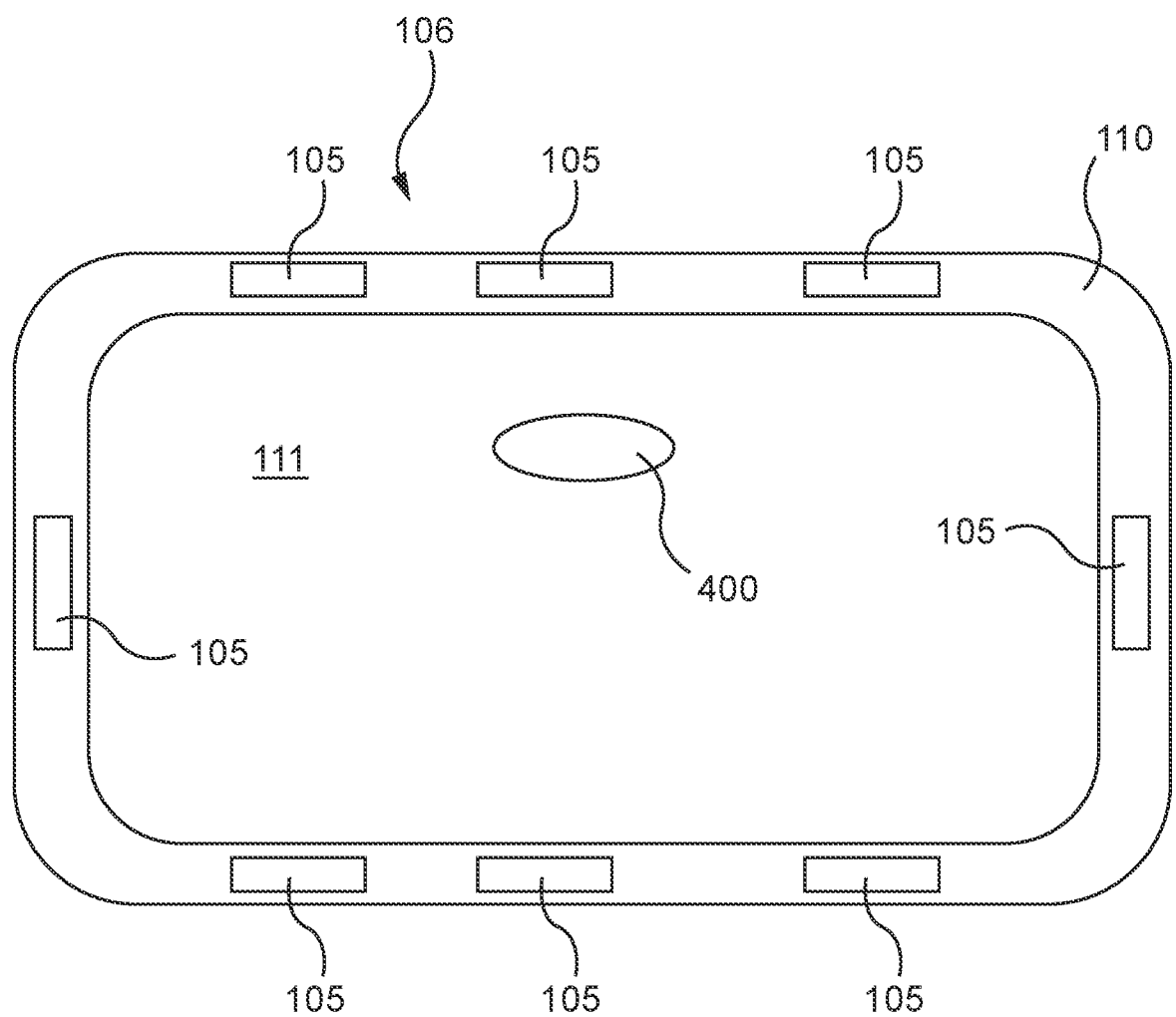
Figure 5C:
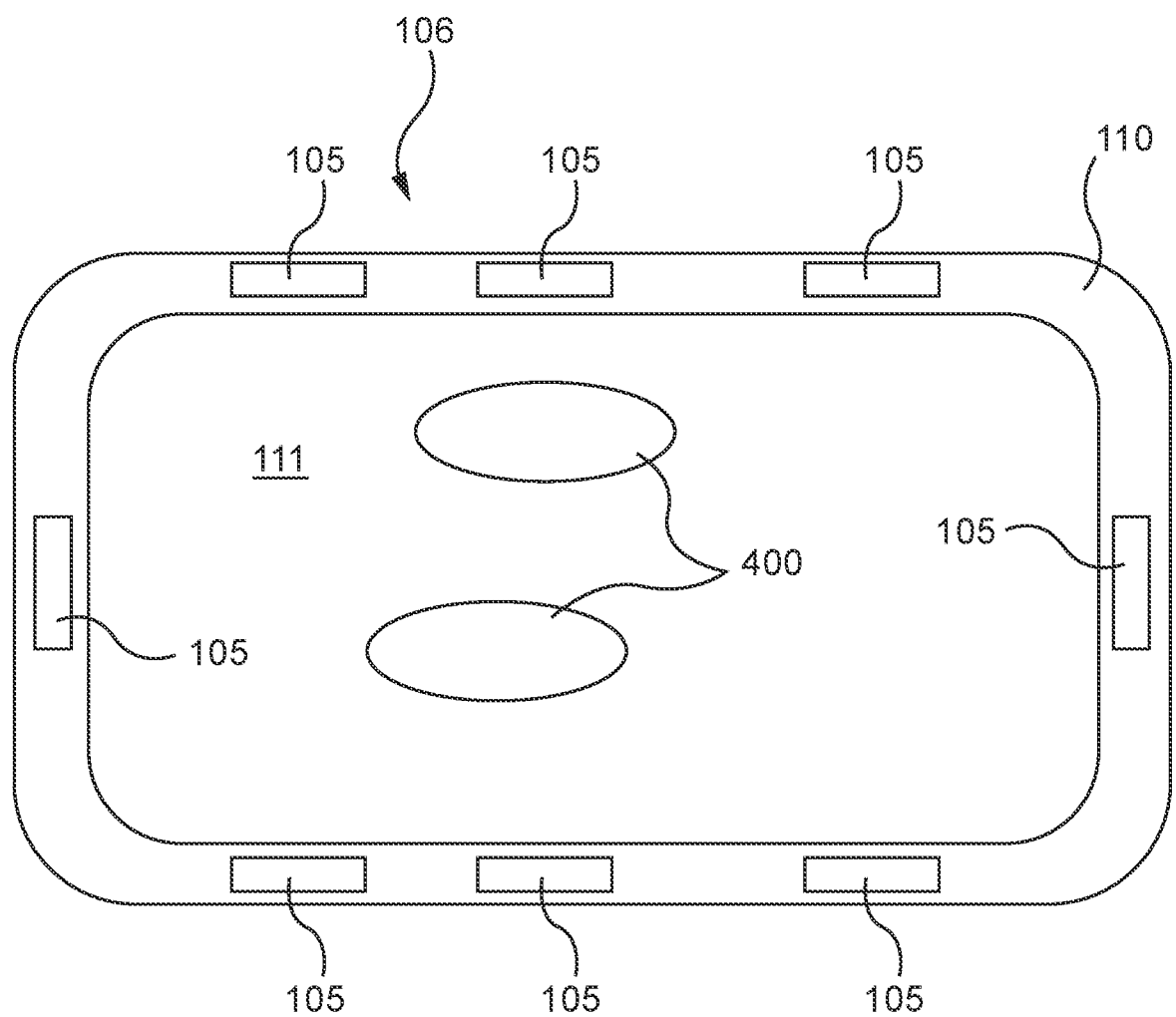

With reference now to FIG. 2, FIGS. 4A-4C, and FIGS. 5A-5C operation of the haptically enabled display device 100 is explained. The processor 108 determines a haptic control signal configured to activate one or more of the haptic actuators 105 to cause localized haptic effects at one or more target locations of the viewing area 111 according to vibrational modes of the display screen 106. FIGS. 4A-C illustrate the principles of vibrational modes of the haptically enabled display device 100 in accordance with embodiments hereof, while FIGS. 5A-5C illustrate target locations 400 for haptic effects in accordance with embodiments hereof.

The display screen 106 of the haptically enabled display device 100, like all structures, has multiple vibrational modes that depend on the characteristics of the screen (e.g., size, thickness, stiffness, etc.) and its mounting. A vibrational, or normal, mode of a system describes an oscillating or vibrating pattern of movement in which the parts of the system oscillate sinusoidally at the same frequency and in phase with one another. Each vibrational mode of a system corresponds to a specific fixed frequency, i.e., a natural or resonant frequency. A system has multiple vibrational modes at different frequencies, and may oscillate according to the superposition of two or more of the multiple vibrational modes. The vibrational modes of the display screen 106 depend on the material, size, shape, thickness, mounting structure, and other aspects of its construction. When the display screen 106 is subject to vibrations at the specific frequencies equal to the natural frequencies of the vibrational modes, e.g., through activation of the haptic actuators 105, the frequency response of the display screen 106 includes standing waves that establish a standing wave pattern according to the corresponding vibrational mode. By activating one or more of the haptic actuators at specific frequencies and amplitudes, the processor 108 can cause a multitude of standing waves that, together, form a standing wave interference pattern. The standing wave interference pattern can be shaped by the processor 108 to produce localized haptic effects at specific target locations 400.

FIGS. 4A-4C illustrate this principle in one dimension, along the length of a structure 500. FIG. 4A shows a first standing wave 521A extending across the structure 500. In the first standing wave 521A, the nodes 522A have a minimum amplitude of displacement and the antinodes 523A have a maximum amplitude of displacement. Thus, when a haptic actuator is activated at the appropriate frequency to generate the first standing wave 521A in the structure 500, a haptic effect may be felt most strongly at the location(s) of the antinodes 523A and felt minimally or not at all at the location(s) of the nodes 522A. FIG. 4B illustrates the addition of a second standing wave 521B having nodes 522B and antinodes 523B. The second standing wave 521B is shown in dashed lines. For the sake of clarity, the nodes 522A and antinodes 523A are not labeled in FIG. 4B. For the sake of clarity, only three of the nine antinodes 523B are labeled in FIG. 4B. The second standing wave 521B is twice the frequency of the first standing wave 521A. The second standing wave 521B may be caused by a second haptic actuator or by the same haptic actuator that caused the first standing wave 521A. Each haptic actuator may be excited at multiple superposed frequencies, causing multiple standing waves. When the structure 500 hosts the multiple standing waves, superposition of the amplitudes of the first and second standing waves 521A and 521B creates an interference pattern. The superposition of the first standing wave 521A and the second standing wave 521B creates the interference standing wave 521C, illustrated in FIG. 4C. The interference standing wave 521C includes amplitude maximum locations 525 and amplitude minimum locations 526. As can be seen in FIG. 4C, the first standing wave 521A and the second standing wave 521B may interfere constructively, to form increased displacement amplitudes, and may interfere destructively, to form decreased or cancelled displacement amplitudes. Amplitude maximum locations 525 represent the locations at which the displacement is at a maximum amplitude. Amplitude minimum locations 526 represent the locations at which the displacement is at a minimum amplitude. Haptic effects may be felt most strongly at or near amplitude maximum locations 525 and most weakly at or near amplitude minimum locations 526. FIG. 4C illustrates a simple superposition of two standing waves 521A and 521B to create an interference standing wave 521C. This principle can be extended to using three or more standing waves of different frequencies and amplitudes, selected to create an interference standing wave having a desirable pattern of amplitude maximum locations and amplitude minimum locations to produce haptic effects at specific discrete areas along structure 500.

FIGS. 4A-4C illustrate the principles of standing waves in a single dimension for ease of understanding. The examples shown illustrate only a very small number of possible standing wave patterns in a single dimension. These examples illustrate the principles of standing wave patterns, which are implemented in greater complexity across the two-dimensional display screen 106 to provide the localized haptic effects discussed herein. Many more standing wave patterns are possible, depending on the dynamics of the haptically enabled display device 100, including the mass, damping, and stiffness of the various components, as well as the placement and driving frequencies of the haptic actuators 105. With reference now to FIGS. 5A-5C, in the haptically enabled display device 100, these principles are applied in two dimensions across the surface of the display screen 106.

FIGS. 5A-5C illustrate target locations 400 for haptic effects on the display screen 106 in accordance with embodiments hereof. Each of FIGS. 5A-5C show the display screen 106 with a plurality of haptic actuators 105 located in the non-viewing area 110 of the display screen 106, with a target location(s) 400 in the respective viewing area 111. The processor 108 is configured to activate one or more of the haptic actuators 105 to cause a localized haptic effect at the target location 400 in the viewing area 111 of the display screen 106. FIG. 5A illustrates the haptic actuators 105 providing a localized haptic effect across a large target location 400. FIG. 5B illustrates the haptic actuators 105 providing a localized haptic effect across a smaller, more focused, target location 400. FIG. 5C illustrates the haptic actuators 105 providing a localized haptic effect across two target locations 400. The size, shape, and number of target locations are manipulated by the processor 108 through activation of the haptic actuators 105 at varying frequency and amplitude patterns.

Activating one of the haptic actuators 105 at a frequency corresponding to a vibrational mode of the display screen 106 sets up a two-dimensional standing wave pattern in the display screen 106 having amplitude maximum locations and amplitude minimum locations, as discussed above in the one-dimensional case. The standing wave pattern induced by one of the haptic actuators 105 depends on the location of the haptic actuator, the vibrational modes of the display screen 106 and the frequency of activation. Different activation frequencies induce different standing wave patterns. Altering the amplitude of activation of the haptic actuators 105 alters the amplitude of the standing wave patterns.

The processor 108 is configured to cause a localized haptic effect at a target location 400 by causing multiple standing wave patterns in the display screen 106 through the activation of one or more of the haptic actuators 105. When superposed, the multiple standing wave patterns form a standing wave interference pattern that results in the localized haptic effects at the target locations 400. The multiple standing wave patterns may be caused by the activation of multiple haptic actuators 105 at one or more frequencies, by the activation of a single haptic actuator 105 at multiple frequencies, or by a combination of multiple haptic actuators 105, each being activated at multiple frequencies.

The processor 108 determines the characteristics of a haptic control signal or multiple haptic control signals for activating one or more of the haptic actuators 105. When activated by the haptic control signal(s), the haptic actuators cause a localized haptic effect at the target location (or locations) 400, within the viewing area 111. The haptic effect is localized, occurring only within a discrete portion, i.e., the target location 400, of the display screen 106 while only substantially imperceptible haptic effects occur outside of the target location 400. Substantially tactilely imperceptible haptic effects include vibrations or screen movements that are either difficult or impossible for a user to tactilely detect as well as an absence of vibrations or screen movements. Although causing the localized haptic effects with the haptic actuators 105 may cause non-target locations to vibrate, these vibrations are minimized through standing wave superposition so as to be faint to a user or to fall below a user tactile perception threshold and thus be tactilely imperceptible. Substantially tactilely imperceptible haptic effects may thus include minimal or faint haptic effects, imperceptible haptic effects, and/or zero haptic effects. In portions of the display screen 106 where substantially tactilely imperceptible haptic effects occur, any vibration or movement of the display screen 106 that does occur is small enough to fall below a user's tactile perception threshold or small enough to be detected only faintly. In embodiments, any effects occurring outside of the target locations 400 are either at or below the level of a substantially tactilely imperceptible haptic effect. Thus, the haptic effect occurring within the target location 400 may easily be felt by a user, while it is difficult or impossible for a user to feel the substantially tactilely imperceptible haptic effects outside of the target location 400. In embodiments, a minimally perceptible haptic effect has a peak to peak acceleration of approximately 0.5 g. Thus, a substantially tactilely imperceptible haptic effect has a peak to peak acceleration of less than approximately 0.5 g.

In embodiments, the haptic effect occurring within the target location 400 may be substantially stronger, i.e., 5, 10, 100, 500 or more times as strong, than a minimally perceptible haptic effect or a substantially tactilely imperceptible haptic effect occurring outside of the target location 400.

In determining the haptic control signal, the processor 108 is configured to select one or more haptic actuators 105 from among the plurality of haptic actuators 105 for activation. The processor 108 may select just one haptic actuator 105 and/or may select any number of available haptic actuators 105. Subsequent to selection of the haptic actuator(s) 105, the processor is configured to output the haptic control signal to the haptic actuators 105 to cause the localized haptic effect at the target location 105.

The processor 108 activates the selected haptic actuators 105 to produce a standing wave interference pattern configured to provide the localized haptic effect at one or more target locations 400. The processor 108 determines one or more haptic control signals to activate the corresponding haptic actuators 105 at frequencies and amplitudes selected according to the vibrational modes of the display screen 106, and transmits the one or more haptic control signals to the corresponding haptic actuators 105. The processor 108 thus selects the haptic actuators 105 and the haptic control signals to establish one or more standing wave patterns in the display screen. The one or more standing wave patterns, when superposed, create an interference standing wave pattern having one or more amplitude maximum locations. The haptic control signals are selected so as to create an interference standing wave pattern having amplitude maximum locations that correspond with the target location(s) 400, thus producing localized haptic effects in those locations. The interference standing wave pattern is further configured to produce a substantially tactilely imperceptible, i.e., minimally perceptible or imperceptible, haptic effect outside of the target location(s) 400.

In embodiments hereof, the one or more target locations 400 may include two or more target locations 400, as shown in FIG. 5C. That is, the processor 108 may determine the haptic control signal(s) to activate the haptic actuator(s) 106 to cause a first and a second localized haptic effect at a first and a second target location. The first and second localized haptic effects may have different target locations 400 that overlap or may be discrete from one another. Overlapping target locations 400 may coincide with two distinct amplitude maximum locations that are close enough together such that there is no area of substantially imperceptible haptic effects between them. The area between the amplitude maximum locations still has tactilely perceptible haptic effects, although they are diminished away from the amplitude maximum locations. Target locations 400 that are discrete from one another have areas between them of substantially tactilely imperceptible haptic effects.

The processor 108 is further configured to determine the haptic control signals to activate the haptic actuators 105 to provide localized haptic effects having specific characteristics. Specific characteristics may include magnitude, frequency, and size of the localized haptic effect. Specific characteristics of the localized haptic effects may further include ramp-up and ramp-down profiles. Where two or more localized haptic effects are provided at two or more target locations 400, specific characteristics between the two or more haptic effects may differ. For example, a user may touch the display screen 106 in two places, and a localized haptic effect may be delivered to the user in a target location 400 corresponding to each of the two places. Each of the two localized haptic effects may have different specific characteristics.

The processor 108 is further configured to determine the haptic control signals to activate the haptic actuators 105 to move a target location 400. The processor 108 may dynamically adjust the haptic control signals to cause the target location 400 to move across the display screen 106. For example, the target location 400 may be moved to guide a user's finger or other body part across the display screen 106 to a new location on the display screen 106.

In accordance with embodiments hereof, the target locations 400 may be remote from each of the plurality of haptic actuators 105 that are activated to cause the localized haptic effects associated with each target location 400. As shown in FIGS. 5A-5C, each of the target locations 400 is located away from the plurality of haptic actuators 105. The target locations 400 are located such that they are not directly above any of the plurality of haptic actuators 105 that cause the localized haptic effect within the target location 400. Further, there are areas of substantially tactilely imperceptible or zero haptic effects between the haptic actuator 105 locations and the target location 400. The target location 400 may comprise a portion of the viewing area. The processor 108 is configured to determine or select the one or more haptic control signals so as to cause substantially tactilely imperceptible or zero haptic effects in the viewing area outside of the target location 400.

In alternative embodiments, the target locations 400 may not be located remote from the haptic actuators 105 that generate the localized haptic effects. The haptic actuators 105 may generate a localized haptic effect in a target location 400 that coincides with the location of the haptic actuator 105. Use of the interference standing wave pattern, in such an embodiment, may permit such a haptic effect to be localized and not extend across non-target locations of the display screen 106.

In accordance with further embodiments hereof, the processor 108 activates the selected haptic actuators 105 to produce a standing wave interference pattern configured to provide the localized haptic effect at one or more target locations 400 and at non target locations as well. The processor 108 activates the selected haptic actuators 105 to produce localized haptic effects at the specific target locations 400. As discussed above, the target locations 400 may be selected, e.g., to provide haptic sensation to a user at a specific point on the display screen 106 where the user is contacting the display screen 106. In some examples, the processor 108 may activate the haptic actuators 105 to produce a standing wave interference pattern that produces additional haptic effects outside of the target locations 400. Because the user is contacting the screen at the target locations only, such additional haptic effects may not be noticed by the user.

In accordance with embodiments hereof, the haptic actuators 105 may further be configured to receive user inputs. Some types of haptic actuators, such as piezoceramic actuators, are capable of converting a mechanical input into an electrical output as well as converting an electrical input into a mechanical output. Accordingly, these actuators may be used both for the provision of haptic effects and for the reception of user inputs. User input to a screen, i.e., pressing or tapping on a screen in a particular location causes mechanical vibrations that extend across the screen, to areas away from the user's initial contact. The haptic actuators 105 may receive those mechanical vibrations and, in response, convert the vibrations to electrical output. The processor 108 may be configured to interpret the electrical outputs of one or more of the haptic actuators 105 to determine a location on the display screen 106 of the user input. Thus, a user input in the viewing area 111 of the display screen 106 may be detected and recognized by the haptic actuators 105 located in the non-viewing area 110 of the display screen.

Figure 6:
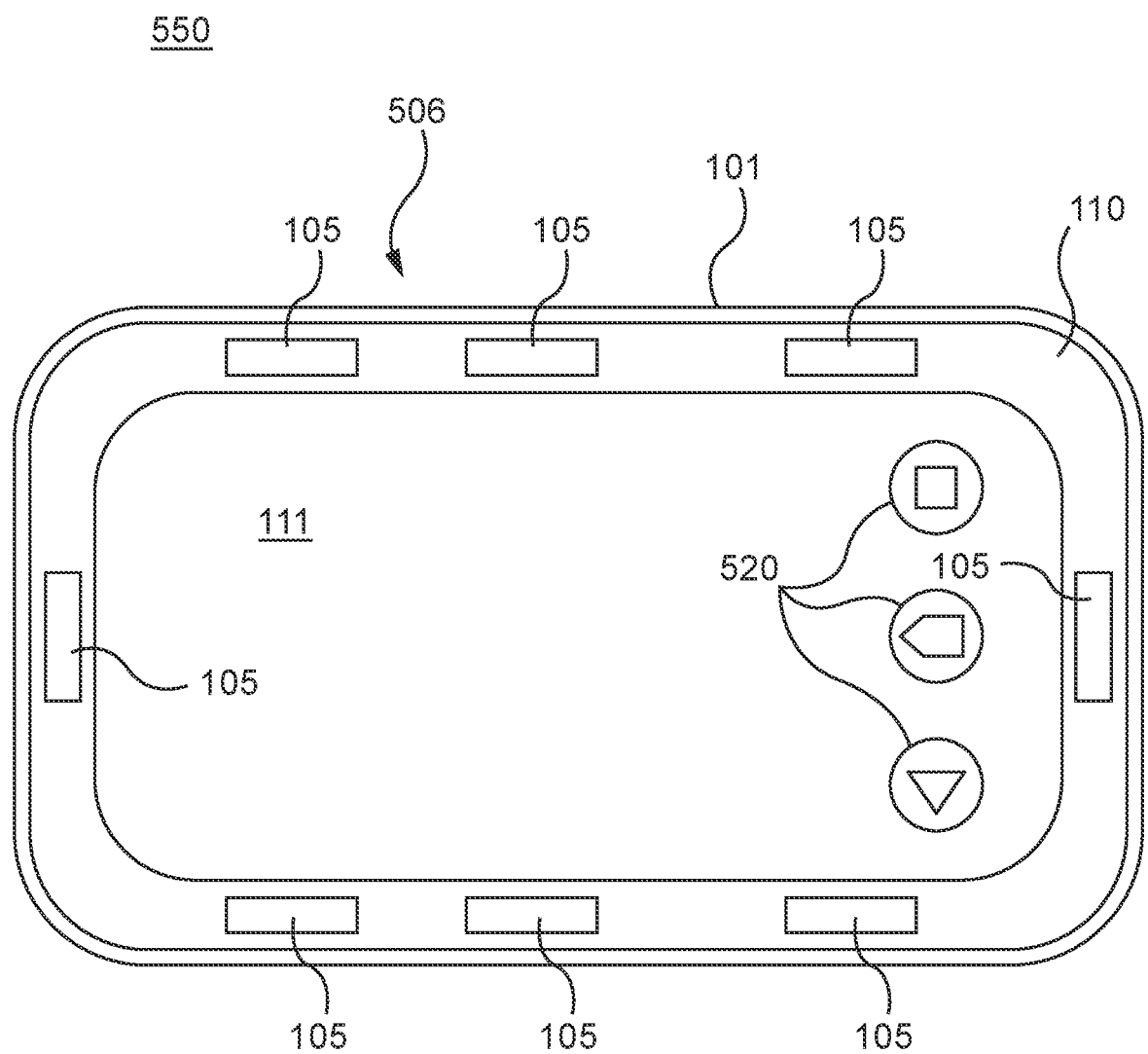
FIG. 6 illustrates a haptically enabled display device having fixed target locations in accordance with embodiments hereof.

FIG. 6 illustrates an additional embodiment of a haptically enabled display device in accordance with embodiments hereof. The haptically enabled display device 550 of FIG. 6 includes a housing 101 and a display screen 506 with a plurality of haptic actuators 105 located in the non-viewing area 110 of the display screen 506, with multiple fixed target location(s) 520 in the viewing area 111. The haptically enabled display device 550 may further include any or all features described with respect to the haptically enabled display device 100. The fixed target locations 520 are fixed locations on the display screen 506. The processor 108 is configured to activate the haptic actuators 105 to cause localized haptic effects at one or more of the fixed target locations 520. The fixed target locations 520 may correspond to locations on the display screen 506 that represent user interaction points, discrete soft buttons, and/or other points on the screen that are frequently accessed by a user, such as the "menu," "home," and "back," soft-buttons in the Android® user interface. In embodiments, memory unit 120 may store a library of pre-programmed haptic control signals. Each of the pre-programmed haptic control signals may be configured to activate the haptic actuators 105 to cause a standing wave interference pattern for causing one or more haptic effects at the fixed target locations 520. Accordingly, the processor 108 may select from a plurality of pre-programmed haptic control signals to cause localized haptic effects at known, fixed target locations 520. The pre-programmed haptic control signals may be optimized through testing of the haptic effects they cause at the fixed target locations 520.

Figure 7:
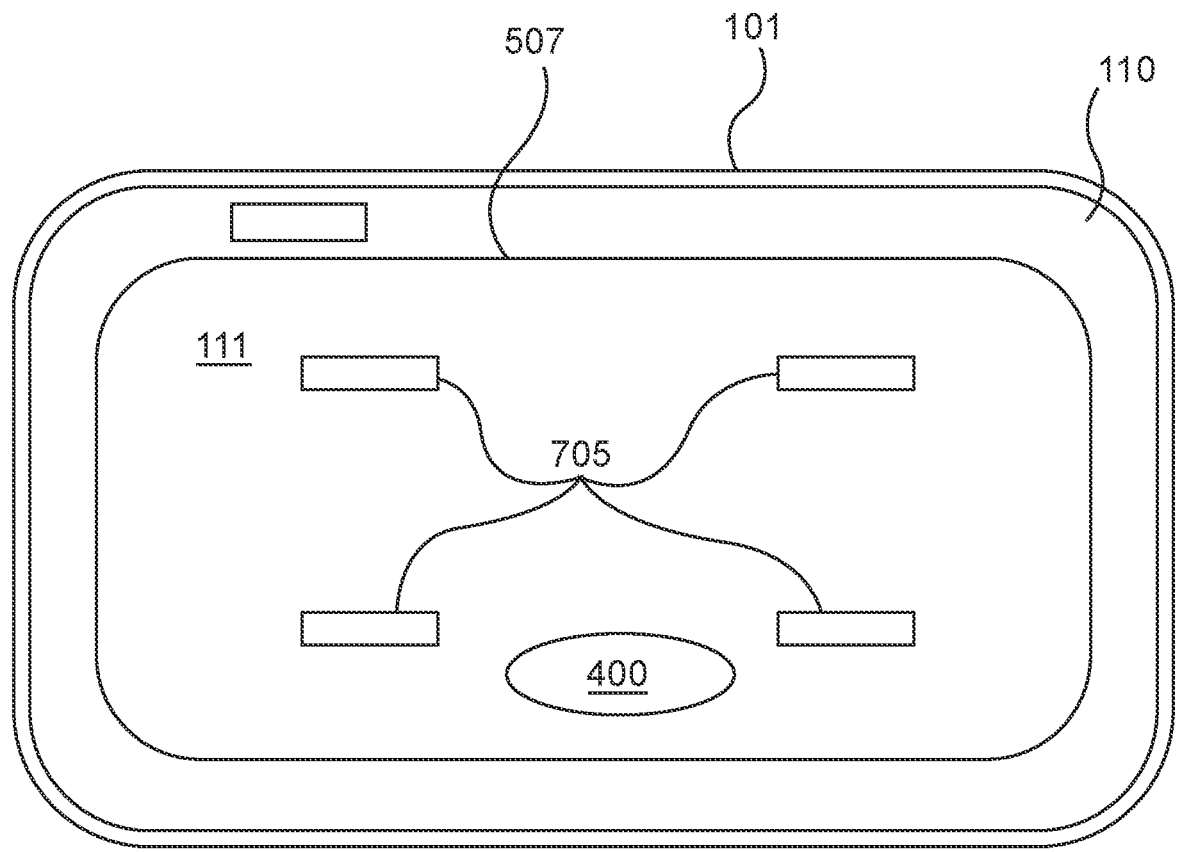
FIG. 7 illustrates a haptically enabled display device having haptic actuators located within the display area of the display screen in accordance with embodiments hereof.

FIG. 7 illustrates an embodiment including a haptically enabled display device 570 that includes a housing 101 and a display screen 507 with a plurality of haptic actuators 705 located in the viewing area 111 of the display screen 507. The haptically enabled display device 550 may further include any or all features described with respect to the haptically enabled display device 100. The plurality of haptic actuators 705 are transparent, and thus do not interfere with viewing of the screen. In some embodiments, the viewing area 111 may encompass the entirety of the display screen 507, extending to the edges of the haptically enabled display device 570, completely eliminating any non-viewing area 110. The haptically enabled display device 570 functions similarly to the haptically enabled display device 100, and includes the processor 108, which is configured to cause the activation of the haptic actuators 705 to cause localized haptic effects at one or more target locations 400 on the display screen 507. In embodiments, the one or more target locations 400 are fixed target locations, as described with respect to FIG. 6.

Figure 8A:
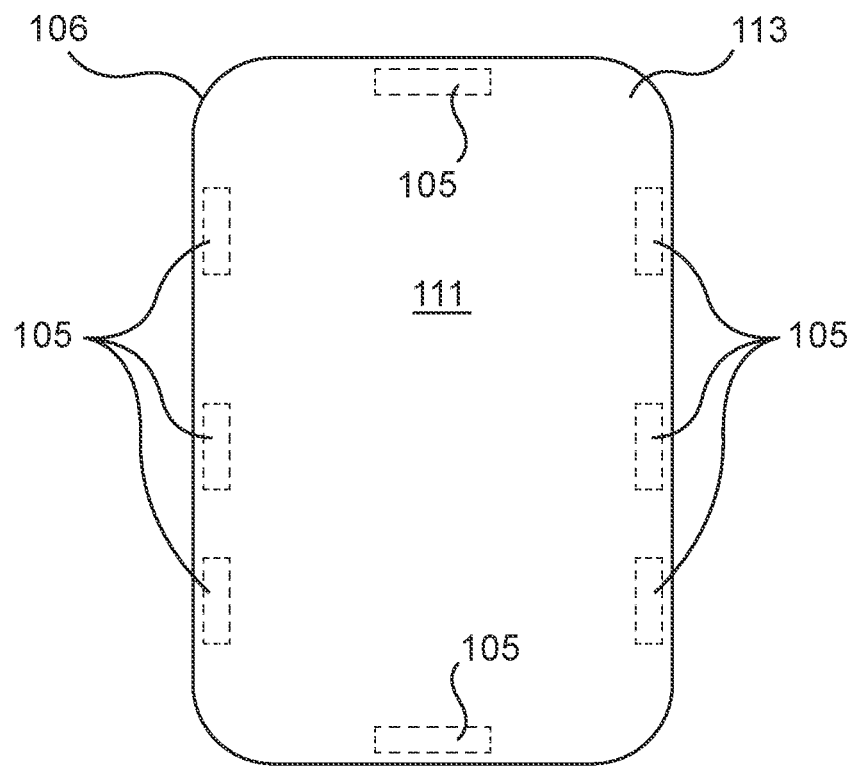
FIGS. 8A and 8B illustrate an alternative embodiment of a haptically enabled display device in accordance herewith.
Figure 8B:
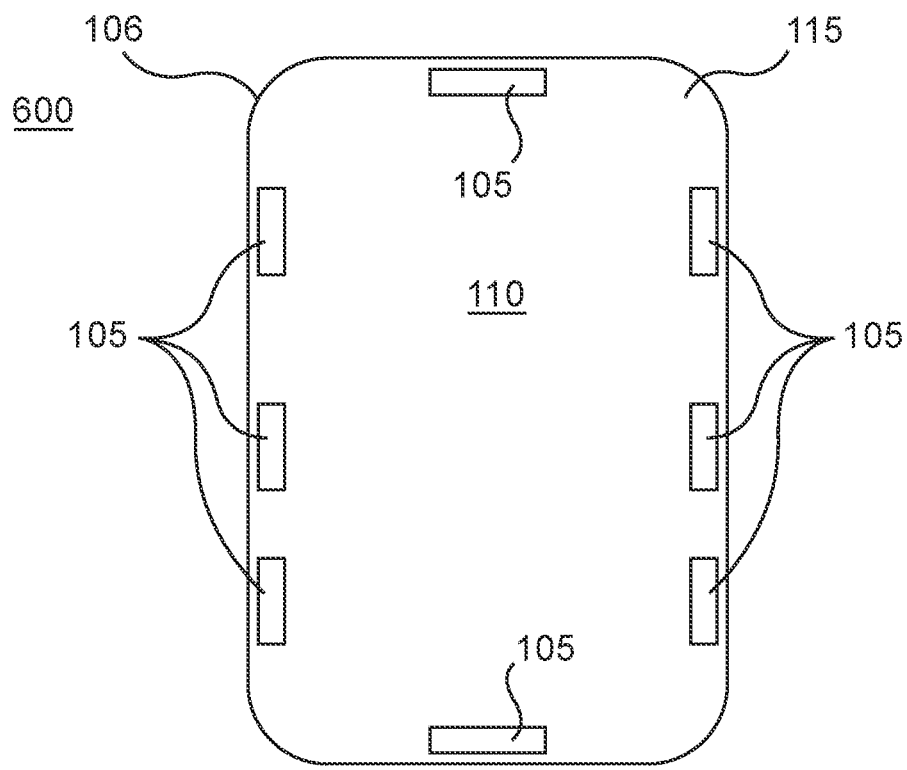

FIGS. 8A and 8B illustrate an alternative embodiment of a haptically enabled display device in accordance with embodiments hereof. The haptically enabled display device 600 of FIGS. 8A and 8B includes a plurality of haptic actuators 105 located in a non-viewing area 110 on the rear of the display screen 106, on an opposite side of the display screen 106 from the viewing area 111. FIG. 8A illustrates a first or front side 113 of the display screen 106 having the viewing area 111 extended to edges thereof, while FIG. 8B illustrates a second or rear side 115 of the display screen 106 having the non-viewing area 110. In other respects, the haptically enabled display device 600 may be similar to the haptically enabled display device 100 as illustrated in FIG. 1 and may include any or all components of the haptically enabled display device 100 as discussed above. The design of the haptically enabled display device 600, with the haptic actuators 105 in a non-viewing area 110 on the rear side of the display screen 106 permits the viewing area 110 to extend edge to edge of the display screen 106. Such a form factor may be desirable for both mobile device applications, such as tablets, smart phones, phablets, and gaming devices, as well as stationary applications, such as large display screens, informational kiosk screens, and others.

Located on the rear side of the display screen 106, the haptic actuators 105 are out of view, and cannot obscure the image on the front side of the display screen 106. In such an embodiment, the haptic actuators 105 may be placed in locations other than the periphery of the display screen 106. The principles and techniques described herein for generating localized haptic effects at target locations remote from the haptic actuators 105 are advantageous in this embodiment, as a small number of haptic actuators 105 are capable of providing haptic effects at any location on the display screen 106.

Figure 9A:
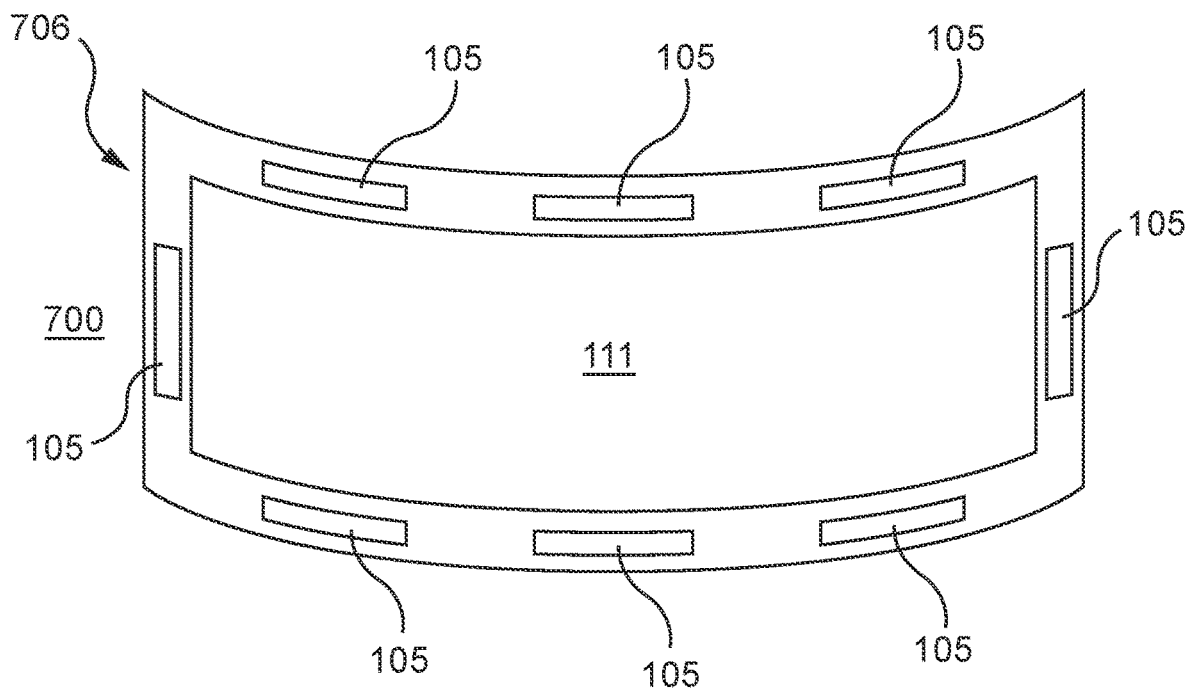
FIGS. 9A and 9B illustrate an alternative embodiment of a haptically enabled display device in accordance herewith.
Figure 9B:
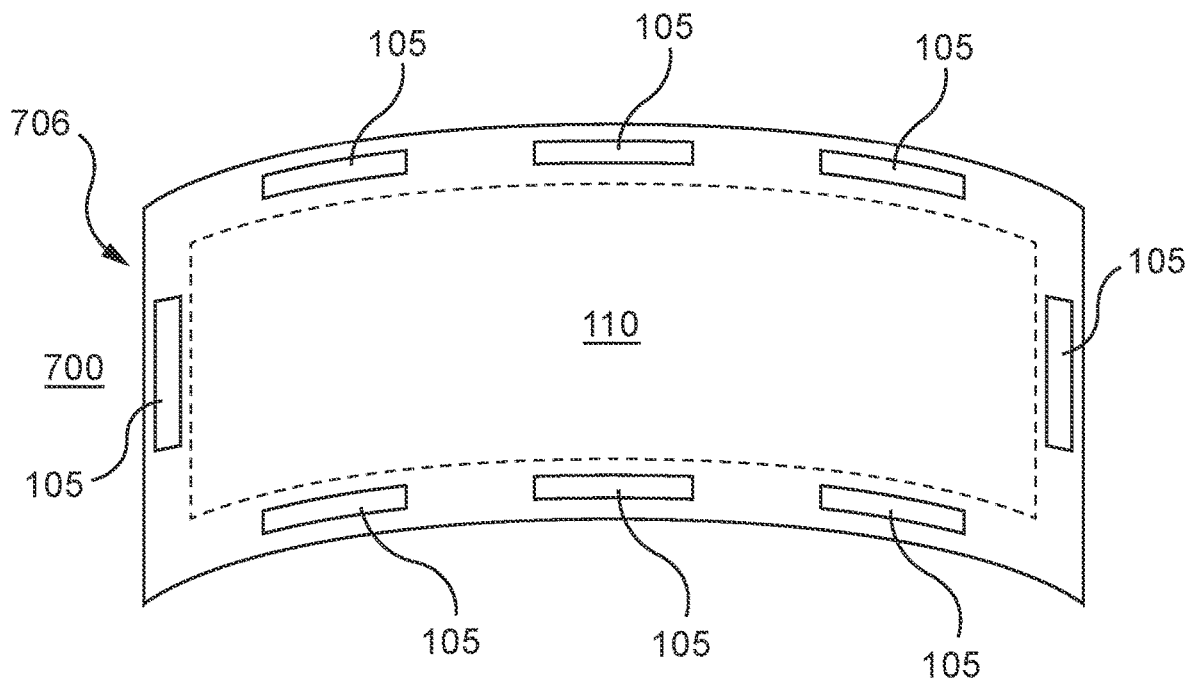

FIGS. 9A and 9B illustrate an alternative embodiment of a haptically enabled display device 700 in accordance with embodiments hereof. The haptically enabled display device 700 of FIGS. 9A and 9B includes a flexible display screen 706, with a plurality of haptic actuators 105 located in a non-viewing area 110 on the rear side 115 of the display screen 106 shown in FIG. 9B, on an opposite side of the display screen 106 from the viewing area 111 shown in FIG. 9A. In other respects, the haptically enabled display device 700 may be similar to the haptically enabled display device 100 as illustrated in FIG. 1 and may include any or all components of the haptically enabled display device 100 as discussed above. Located on the rear side 115 of the display screen 106, the haptic actuators 105 are out of view, and cannot obscure the image on the front side 113 of the display screen 106. In such an embodiment, the haptic actuators 105 may be placed in locations other than the periphery of the display screen 106. The principles and techniques described herein for generating localized haptic effects at target locations remote from the haptic actuators 105 are advantageous in this embodiment, as a small number of haptic actuators 105 are capable of providing haptic effects at any location on the display screen 106.

Figure 10:
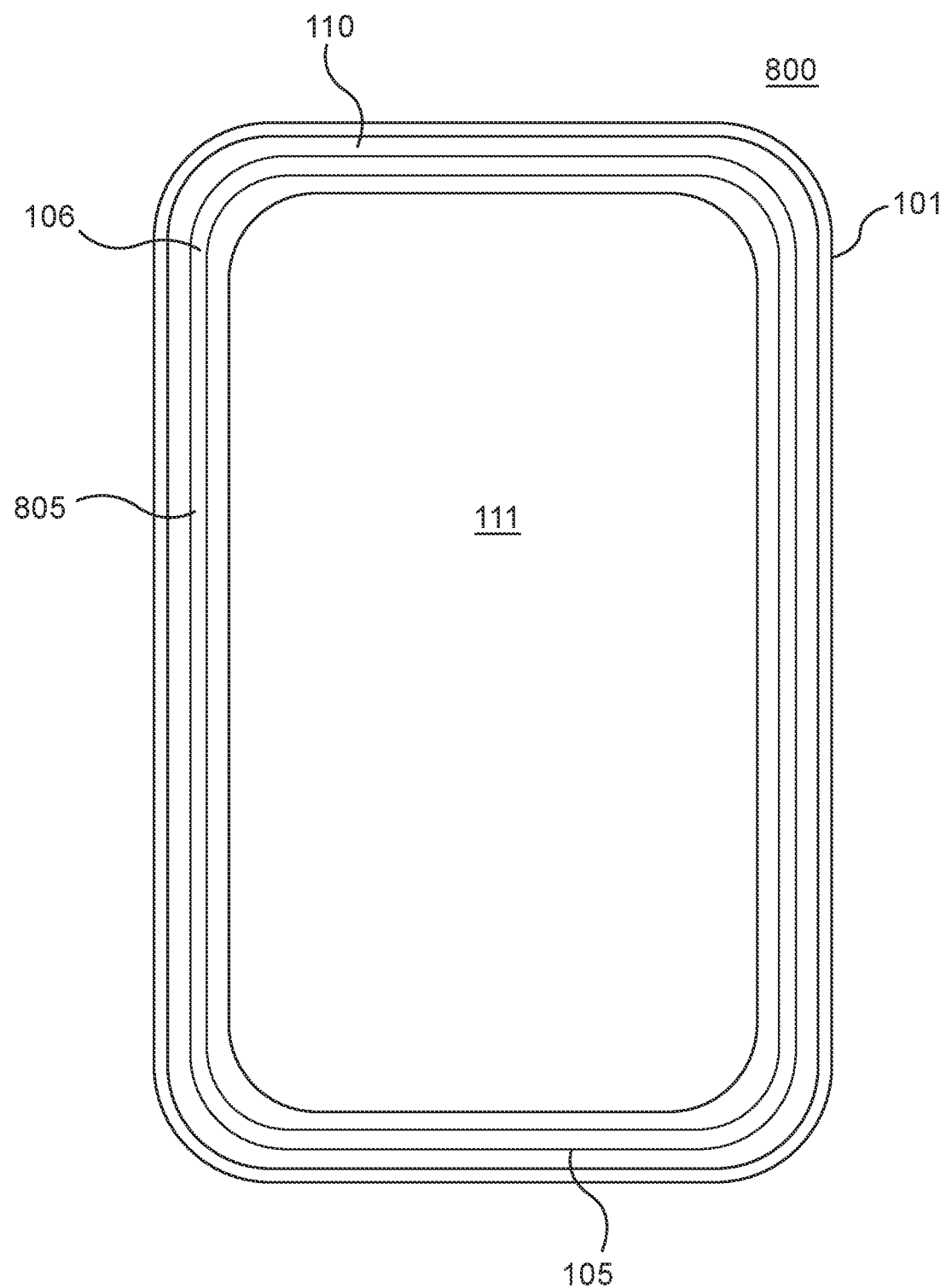
FIG. 10 illustrates an alternative embodiment of a haptically enabled display device in accordance herewith.

FIG. 10 illustrates an alternative embodiment of a haptically enabled display device 800 in accordance with embodiments hereof. The haptically enabled display device 800 of FIG. 10 includes a display screen 106 and a housing 101, with a single continuous haptic actuator 805 located in the non-viewing area 110 surrounding the viewing area 111. The continuous haptic actuator 805, as illustrated in FIG. 10, is a thin film actuator secured to the display screen 106 that forms a complete loop or frame around the viewing area 111. In alternative embodiments, the continuous haptic actuator may include other types of actuators known in the art and may include an actuator housing forming the continuous loop or frame around the viewing area 111. In alternative embodiments, a continuous haptic actuator 805 may extend around two, three, or four sides of the viewing area 111 without forming a complete loop. In other respects, the haptically enabled display device 800 may be similar to the haptically enabled display device 100 as illustrated in FIG. 1 and may include any or all components of the haptically enabled display device 100 as discussed above. The principles and techniques described herein for generating localized haptic effects at target locations remote from the haptic actuator 805 are also employed in this embodiment, and the haptic actuators 805 is capable of providing haptic effects at any location on the display screen 106. Thus, the continuous haptic actuator 805 receives, from the processor 108, a haptic control signal including one or more frequencies at varying amplitudes. When the one or more frequencies correspond to vibrational modes of the display screen 106, standing wave patterns corresponding to each of the frequencies are induced. The multiple standing wave patterns combine to form a standing wave interference pattern having amplitude maximum locations at target locations for providing localized haptic effects.

Figure 11:
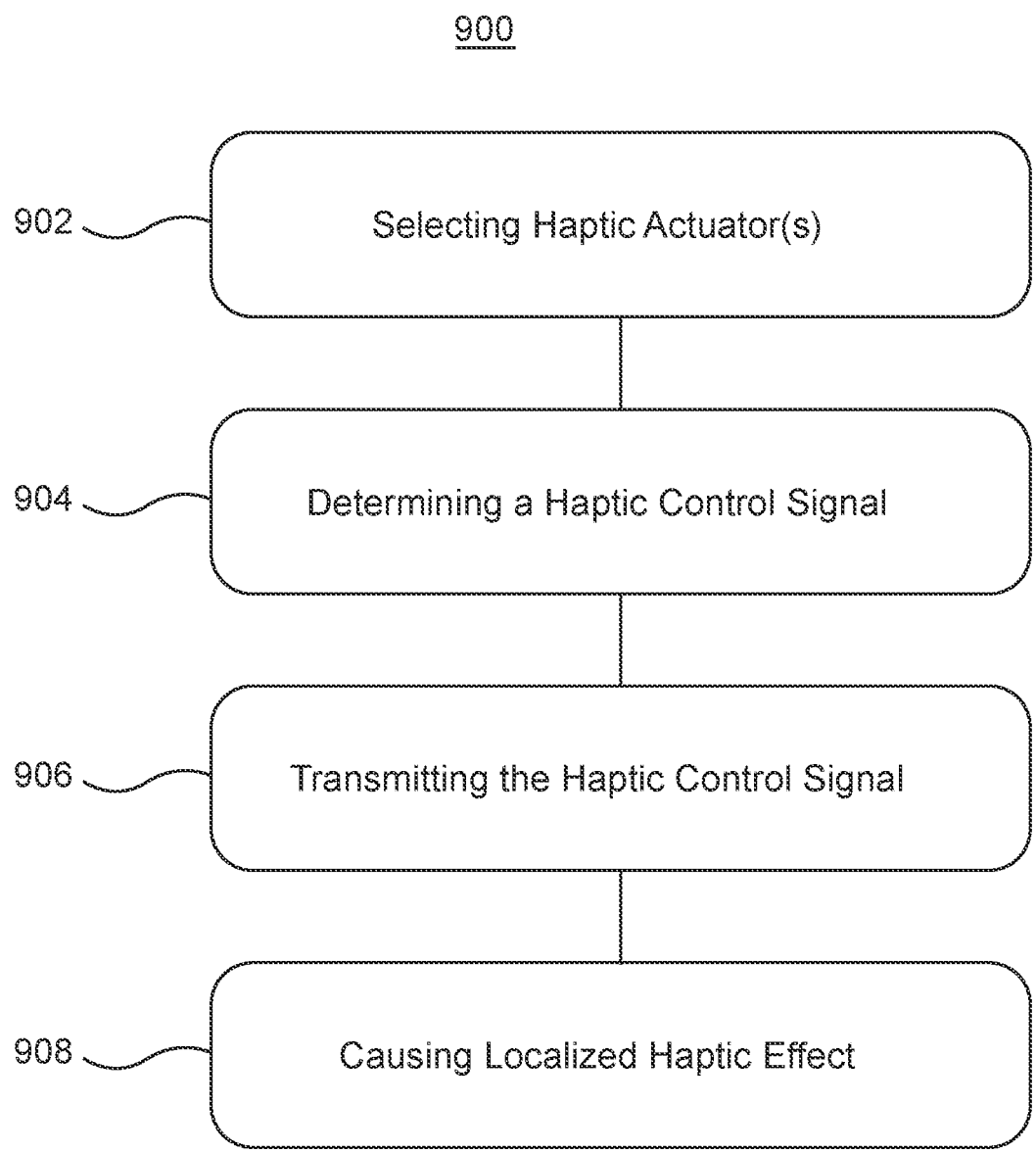
FIG. 11 is a process diagram illustrating a process of providing localized haptic effects in accordance with an embodiment hereof.

FIG. 11 is a process diagram illustrating a system for generating localized haptic effects. The following description of FIG. 11 refers to the haptically enabled display device 100 of FIGS. 1 and 2, but may equally be carried out using the haptically enabled display devices 600, 700, 800 and/or any variations of the haptically enabled display devices presented herein. In embodiments, the functionality of the process diagram of FIG. 11 may be implemented by software and/or firmware stored in the memory unit(s) 120 and executed by the processor 108 of the haptically enabled display device 100. In embodiments, functionality of the process diagram of FIG. 11 may be carried out by processors associated with both a remote computer system and the haptically enabled display device 100. It will be understood by one of ordinary skill in the art that the functionality of FIG. 11 may be performed by devices and systems consistent with the haptically enabled display device 100, haptically enabled display device 600, haptically enabled display device 700, haptically enabled display device 800, and/or a haptically enabled display device or computer system having another configuration consistent herewith.

FIG. 11 illustrates a process 900 of delivering haptic effects to a viewing area of a display screen. The process 900 includes delivering localized haptic effects to target locations of a viewing area of a display screen while only substantially tactilely imperceptible haptic effects occur in the viewing area outside of the target locations. The process 900, as discussed below, may be implemented using the haptically enabled display devices and their variants, as described above.

In an operation 902, process 900 includes selecting, by the processor, one or more haptic actuators from the plurality of haptic actuators secured to the display screen in the non-viewing area. To establish the standing wave interference pattern for causing the localized haptic effects, the processor may first select the haptic actuators to be activated. Due to the different locations of the various haptic actuators, standing wave patterns associated with each may vary. The processor is configured to select the haptic actuators necessary for establishing the standing wave pattern for causing one or more localized haptic effects.

In an operation 904, process 900 includes determining, by the processor, a haptic control signal configured to activate the one or more haptic actuators to cause one or more localized haptic effects at one or more target locations in the viewing area of the display screen. The haptic control signal may be determined to activate the one or more haptic actuators at one or more frequencies according to vibrational modes of the display screen. Activating one of the haptic actuators at a frequency corresponding to a natural vibrational mode of the display screen establishes a standing wave pattern. The superposition of multiple standing wave patterns creates a standing wave interference pattern that provides the localized haptic effects. In embodiments, one or more of the activated haptic actuators may be actuated at a plurality of frequencies. That is, a single actuator may receive a haptic control signal that causes the haptic actuator to activate according to a superposition of two or more signals of differing frequencies and amplitudes. The haptic control signal may include a plurality of haptic control signals, each configured to activate a corresponding haptic actuator from the plurality of haptic actuators at at least one frequency. The haptic control signal may further be configured to cause substantially imperceptible haptic effects at locations within the viewing area that are outside of the target location.

In an operation 906, process 900 includes transmitting the haptic control signal to one or more of the haptic actuators. The haptic control signal may be transmitted to the selected haptic actuators by the processor to cause the activation of the selected haptic actuators.

In an operation 908, process 900 includes causing, by one or more of the haptic actuators, the localized haptic effect at the target location. When the haptic actuators receive the haptic control signal, they are caused to activate. Activation of the haptic actuators at the frequencies and amplitudes specified by the haptic control signal establishes a standing wave interference pattern in the display screen. As discussed above, the processor configures the haptic control signal such that the amplitude maximum locations of the standing wave interference pattern correspond to a target location(s) to produce localized haptic effects at the target location(s).

Accordingly, the process 900 makes use of haptically enabled display devices, as described herein, to produce localized haptic effects in the viewing area of a display screen of the haptically enabled display device.

Thus, there is provided systems, devices, and methods of providing localized haptic effects to a display screen. While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. Aspects of the above methods of rendering haptic effects may be used in any combination with other methods described herein or the methods can be used separately. All patents and publications discussed herein are incorporated by reference herein in their entirety.

What is claimed is:

1. A haptically enabled display device comprising:
a display screen having a viewing area and a non-viewing area, the display screen comprising a plurality of display components configured for providing a visual display in the viewing area;
a plurality of haptic actuators secured to the display screen in the viewing area; and
at least one processor configured to
select at least one haptic actuator from among the plurality of haptic actuators,
determine a haptic control signal configured to activate the at least one haptic actuator in the viewing area and thereby cause a localized haptic effect at a target location that is a discrete portion of the viewing area of the display screen and to cause only substantially tactilely imperceptible haptic effects at locations in the viewing area outside of the target location, and
transmit the haptic control signal to the at least one haptic actuator to cause the localized haptic effect at the target location.

2. The haptically enabled display device of claim 1, wherein the non-viewing area is configured without display components.

3. The haptically enabled display device of claim 1, wherein the display screen further comprises a transparent layer and a substrate, the substrate having a display portion including the plurality of display components to define the viewing area and a non-display portion to define the non-viewing area, wherein the transparent layer overlays the substrate and extends over the display portion and the non-display portion.

4. The haptically enabled display device of claim 3, wherein the plurality of haptic actuators are secured to the transparent layer between the transparent layer and the substrate.

5. The haptically enabled display device of claim 1, wherein the processor is configured to determine the haptic control signal to activate the at least one haptic actuator at at least one frequency according to vibrational modes of the display screen.

6. The haptically enabled display device of claim 1, wherein the at least one haptic actuator includes two or more haptic actuators of the plurality of haptic actuators and the haptic control signal includes two or more haptic control signals, each of the two or more haptic control signals being determined to activate a corresponding haptic actuator from the two or more haptic actuators at at least one frequency according to vibrational modes of the display screen.

7. The haptically enabled display device of claim 1, wherein the target location is a first target location, and the processor is further configured to determine the haptic control signal to activate at least one haptic actuator from among the plurality of haptic actuators so as to cause a second localized haptic effect at a second target location in the viewing area of the display screen that is different than the first target location.

8. The haptically enabled display device of claim 1, wherein the display screen is secured to a rigid housing.

9. The haptically enabled display device of claim 1, wherein the display screen is flexible.

10. The haptically enabled display device of claim 1, wherein the target location is remote from each of the plurality of haptic actuators.

11. The haptically enabled display device of claim 1, wherein the plurality of haptic actuators located in the viewing area are transparent.

12. A method of delivering haptic effects to a display screen having a viewing area and a non-viewing area, the display screen comprising a plurality of display components configured for providing a visual display in the viewing area, the method comprising:
selecting, by at least one processor, at least one haptic actuator from among a plurality of haptic actuators secured to the display screen in the viewing area;
determining, by the at least one processor, a haptic control signal configured to activate the at least one haptic actuator to cause a localized haptic effect at a target location that is a discrete portion of the viewing area of the display screen and to cause only substantially tactilely imperceptible haptic effects at locations in the viewing area outside of the target location;
transmitting the haptic control signal to the at least one haptic actuator; and
causing, by the at least one haptic actuator, the localized haptic effect at the target location.

13. The method of claim 12, further comprising determining the haptic control signal to activate the at least one haptic actuator at at least one frequency according to vibrational modes of the display screen.

14. The method of claim 12, wherein the at least one haptic actuator includes a plurality of haptic actuators and the haptic control signal includes a plurality of haptic control signals, the method further comprising determining each of the plurality of haptic control signals to activate a corresponding haptic actuator from the plurality of haptic actuators at at least one frequency according to vibrational modes of the display.

15. The method of claim 12, further comprising determining the plurality of haptic control signals to establish an interference pattern of vibration in the display, the interference pattern of vibration being configured to provide the localized haptic effect at the target location.

16. The method of claim 12, wherein the target location is a first target location, the method further comprising determining the haptic control signal to activate at least one haptic actuator from among the plurality of haptic actuators so as to cause a second localized haptic effect at a second target location, different than the first target location, in the viewing area of the display screen.

17. The method of claim 12, further comprising determining the haptic control signal to cause the localized haptic effect at the target location remote from the at least one haptic actuator.

* * * * *